US007477030B2

(12) United States Patent
Meckler et al.

(10) Patent No.: US 7,477,030 B2
(45) Date of Patent: Jan. 13, 2009

(54) CEILING FAN WITH ILLUMINATION

(75) Inventors: Peter Meckler, Pommelsbrunn-Hohenstadt (DE); Gerhard Endner, Nürnberg (DE); Thomas Weiss, Roth (DE)

(73) Assignee: Ellenberger & Poensgen GmbH, Altdorf (DE)

( * ) Notice: Subject to any disclaimer, the term of this patent is extended or adjusted under 35 U.S.C. 154(b) by 70 days.

(21) Appl. No.: 11/606,603

(22) Filed: Nov. 30, 2006

(65) Prior Publication Data

US 2008/0129235 A1 Jun. 5, 2008

(51) Int. Cl.
*H02P 27/00* (2006.01)

(52) U.S. Cl. ................ 318/400.3; 318/432; 318/400.22

(58) Field of Classification Search ................ 318/432, 318/434, 400.22, 400.3
See application file for complete search history.

(56) References Cited

U.S. PATENT DOCUMENTS 5,488,273 A * 1/1996 Chang ......................... 318/16
5,627,527 A * 5/1997 Mehta ......................... 340/3.1
6,120,262 A * 9/2000 McDonough et al. .... 417/424.1
6,674,257 B2 * 1/2004 Xi ......................... 318/400.22

* cited by examiner

*Primary Examiner*—Rina I Duda
(74) *Attorney, Agent, or Firm*—Laurence A. Greenberg; Werner H. Stemer; Ralph E. Locher

(57) ABSTRACT

A ceiling fan with electrical illumination has a fan casing and a connection casing for connection of a fan motor and at least one light source to a power supply system. An electronic control device integrated in the ceiling fan automatically limits the electrical power drawn from the power supply system by the light source(s) to a predetermined power value.

12 Claims, 2 Drawing Sheets

CEILING FAN WITH ILLUMINATION

BACKGROUND OF THE INVENTION

Field of the Invention

The invention relates to a ceiling fan with integrated illumination. It also relates to an electronic control device for such a ceiling fan.

Ceiling fans of this type usually comprise a rotor driven by an electrical fan motor having a number of fan blades, as well as an illumination with a number of luminous means that can be switched on and off individually or together, independently of the operation of the fan. The luminous means or the associated lamp bases of the illumination are usually mounted to the fan casing, so that they are accessible from the outside, and are, therefore, a component part of the ceiling fan. An electrical connection cable for the fan motor and for the illumination is inserted into a connection casing, which can be mounted to, or integrated in, the fan casing. Via the connection casing or via the connection cable, the ceiling fan can be connected with a power supply system, providing, for example, an AC voltage of 120 V at a system frequency of 60 Hz. The luminous means used can be conventional artificial light sources, for example incandescent filament lamps or halogen lamps.

SUMMARY OF THE INVENTION

The invention is based on the object of making it possible with such a ceiling fan with integrated illumination to limit the power using very simple means. In addition, a potential risk of fire should be prevented in a simple manner, in particular for the case in which a halogen lamp or luminaire with high power is used as a luminous means.

With the above and other objects in view there is provided, in accordance with the invention, a ceiling fan with electrical illumination, comprising:

a fan casing and a connection casing for connecting a fan motor and to a power supply system;

an electronic control device configured to automatically limit an electrical power drawn by the one or more light sources from the power supply system to a predetermined power value.

In other words, the objects are achieved according to the invention in that an electronic control device is provided which is integrated in the ceiling fan asembly. The control device is designed to automatically limit the electrical power drawn from the power supply system by the illumination, i.e. the luminous means, also integrated in the ceiling fan, to a predetermined value. The electronic control device is advantageously also provided and designed to additionally monitor the electrical power drawn by the fan motor, in particular the motor current.

In accordance with one advantageous variant of the electronic control device, it has first means for detecting an actual current or load current. This presently detected actual current and the present actual voltage, which corresponds, for example, to a supply voltage of 120 V, is used to determine the electrical power presently drawn by the luminaire. The electronic control device uses a comparison of the power value derived from the actual current and from the actual voltage, with a, for example, voltage-compensated reference value to limit the actual current such that the electrical power drawn by the illumination is less than, or equal to, a maximum power value, in particular less than, or equal to, 190 W. Voltage compensation is not required for a less precise power measurement.

In one preferred embodiment, the electronic control device comprises a measurement sensor, in particular a current sensor, for measuring a power parameter. Furthermore, the electronic control device comprises a comparator, which is supplied on the input side with the value or parameter detected by the measurement sensor and a reference value. The comparator is connected on the output side to a controllable switch or switch component, for example to a MOSFET (Metal Oxide Semiconductor Field Effect Transistor) as a power semiconductor, or to a relay. The luminaires or luminous means of the illumination are disconnected by means of the relay when the maximum power value is reached, and switched on again when it is undershot.

However, the electronic control device preferably comprises a controllable electronic switch in the form of a power semiconductor which can be triggered, preferably a triac, a thyristor or a GTO thyristor (gate turn-off thyristor). In this case, a triac is in principle a parallel circuit comprising two thyristors for controlling the two half-waves of an AC voltage using a single component. A thyristor is understood to mean a controllable rectifier in the form of a semiconductor. A GTO thyristor, in a corresponding manner to a conventional thyristor, can be switched on with a positive voltage pulse at the control input. In contrast to a conventional thyristor, the GTO thyristor can, however, also be switched off by means of a negative voltage pulse. This additional disconnection option simplifies the driving electronics in the case of a GTO thyristor.

In one expedient development, the electronic control device has an electronic amplifier having an amplifier input connected with the measurement sensor and having an amplifier input connected to the first comparator input. In addition, the controllable electronic switch, i.e. the triac, thyristor or GTO thyristor, is expediently connected to a dimmer circuit for automatically adjusting the maximum electrical power supplied to the luminous means. The power can be limited by means of phase-gating or phase-chopping control. The dimmer circuit can also be operated manually in order, if necessary, to adjust the luminous intensity of the luminous means and thus the desired brightness of the luminaire.

The electronic control device can be arranged within the ceiling fan in principle at different places between the luminous means or lamp base of the illumination and the connection plug of the connection cable. The electronic control device can be arranged, for example, in the fan casing. Preferably, the electronic control device is arranged in an existing connection casing of the ceiling fan, in particular in a connection casing shared by the illumination and the fan motor.

The electronic control device can also be arranged in a separate adapter. This adaptor is then designed to be plugged onto the connection cable and to be inserted into an existing connection casing of the ceiling fan. The use of such an adapter having an integrated electronic control device for limiting the power of the ceiling fan or the latter's illumination is particularly suitable for retrofitting such a ceiling fan.

Other features which are considered as characteristic for the invention are set forth in the appended claims.

Although the invention is illustrated and described herein as embodied in ceiling fan with illumination, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
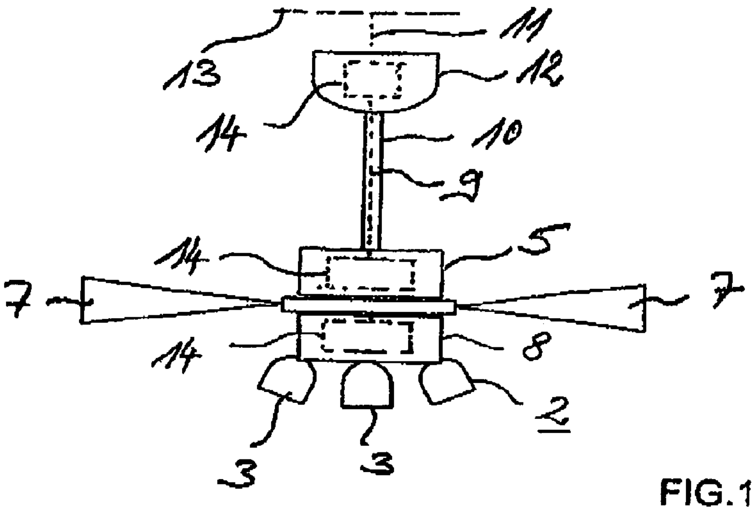
FIG. 1 shows a schematic of a ceiling fan with electrical illumination and integrated electronic control device for power limitation purposes.

Referring now to the figures of the drawing in detail and first, particularly, to FIG. 1 thereof, there is shown a schematic of a ceiling fan 1 with integrated illumination 2 having a number of lamp bases 3 for accommodating, in the exemplary embodiment, three light sources 4 (i.e., luminous means). The light sources, or luminous means 4, indicated in FIG. 2 with an electrical symbol of a lamp, can be halogen lamps or incandescent filament lamps. The ceiling fan 1 comprises a fan casing or motor casing 5 for an electric fan motor 6 symbolized in FIG. 3, driving a number of fan paddles 7. The ceiling fan 1 comprises a connection casing 8 for connecting the lamp base 3 or the luminaires or luminous means 4 to a connection cable 9. The connection cable 9, which is also connected to the fan motor 6 inside the fan casing 5, is passed via a connection pipe 10 into a connection casing 12 covering a ceiling outlet 11. Over the ceiling outlet 11 and the connection cable 9, the fan motor 6 and the illumination 2 of the ceiling fan 1 are connected in an electrically conductive manner with an electrical power supply system 13, indicated by dashed lines. While the connection casing 8 is mounted to the fan casing 5 or is integrated in it and is, therefore, arranged in its immediate spatial vicinity, the connection casing 12 constitutes a casing component which is spatially separated from the fan casing 5.

With the connection cable 9 connected to the power supply system 13, the ceiling fan 1 is supplied with a system voltage $U_{AC}$ of, for example, 120 V at 60 Hz. An electronic control device 14 serves the purpose of limiting the power of the ceiling fan 1 such that the electrical power (P) drawn from the power supply system 13 via the connection cable 9 does no exceed a predetermined power value $P_{max}$. This predetermined maximum power value $P_{max}$ is less than 200 W, preferably 190 W. The electronic control device 14 is arranged in one of the connection casings 8, 12 or at a suitable mounting place between these connection casings 8 and 12, for example in the fan casing 5.

Figure 2:
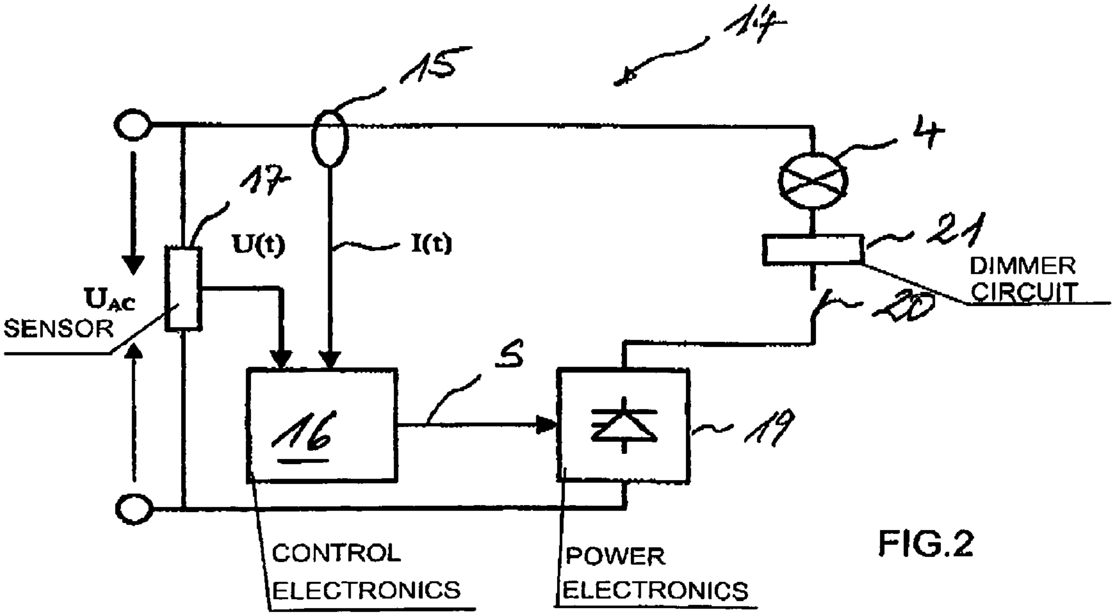
FIG. 2 shows the basic design of the electronic control device for power limitation purposes.

According to FIG. 2, the electronic control device 14 comprises a sensor 15 for detecting the present actual current I(t). This actual current value I(t) is supplied to control electronics 16. Furthermore, a sensor 17 detects the present voltage value U(t), which is U=120 V at a constant supply voltage. The control electronics determine the present power value P(t), and thus the electrical power P presently drawn by the illumination 2 depicted by the single luminous means 4, from these two present parameters I(t) and U(t) using the relationship $P(t)=U(t)\times I(t)$ The fan motor 6 can in this case be switched on or off by means of the switch 18 (FIG. 3).

The control electronics 16 are connected on the output side to power electronics 19, which for their part are connected to the luminous means 4 via a switch 20 and a dimmer circuit 21. The control electronics 16 use a comparison of the presently determined power value P(t) with a reference or threshold value to generate a control signal S for the power electronics 19. If a specific threshold or power value is reached or exceeded, the current or output current $I_L(t)$ supplied to the luminous means 4 is adjusted by means of the driving of the power electronics 19 such that the total power $P_s(t)$ drawn by the luminous means 4 or by the illumination 2 does not exceed the predetermined power value P of, for example, 190 W.

Once the illumination 2 of the ceiling fan 1 has been switched on, the power P drawn from the power supply system 13 by the ceiling fan 1 is automatically limited to $P_L=190$ W. At a constant supply voltage of $U_{AC}=120$ V, the current flowing through the luminous means 4 of the illumination 2 is thus limited to $I_L=P_L/U_{AC}=1.583$ A.

Figure 3:
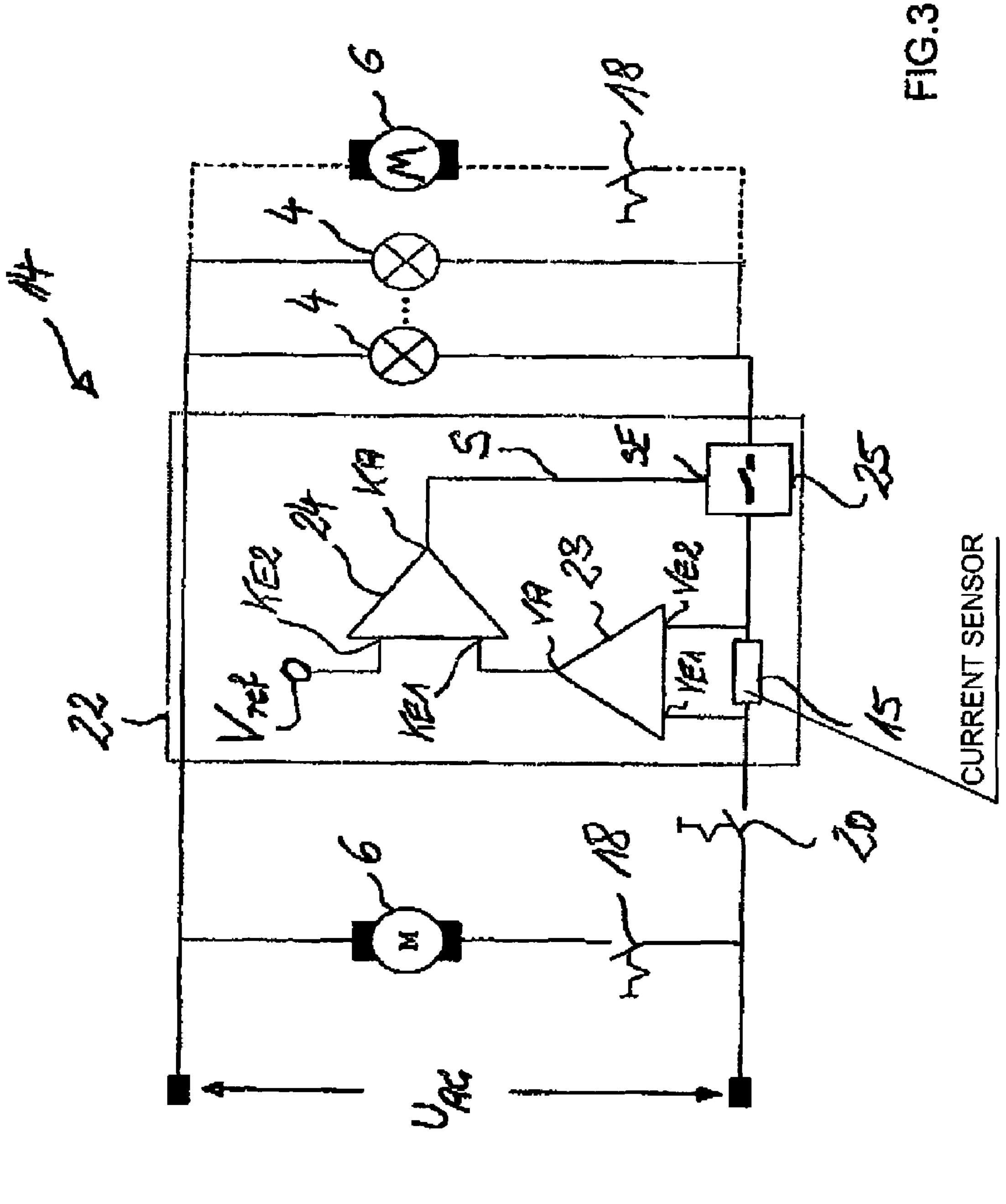
FIG. 3 shows the electronic control device for power limitation purposes having a power regulator for a number of luminous means of the illumination.

One further embodiment of the electronic control device 14 for power limitation is illustrated schematically in FIG. 3. In contrast to the embodiment shown in FIG. 2, the fan motor 6 on two different connection points and several luminous means 4 are depicted here. The electronic control device 14 comprises a power regulator 22. The latter comprises the current sensor 15 and an amplifier module 23. The two inputs VE1 and VE2 of the amplifier module 23 are connected to the current sensor 15. The output VA of the amplifier module 23 is connected to a first input KE1 of a comparator 24. A reference value $V_{ref}$ is supplied to the second comparator input KE2.

The output KA of the comparator 24 is connected to a control input SE of a controllable electronic switch 25. This switch can be a thyristor, a triac or a GTO thyristor. The switch 25 is connected on the output side to the luminous means 4. The comparator 24 generates a control signal S from a comparison of the present actual current I(t), which has been detected by the current sensor 15 and amplified via the amplifier module 23, with the preferably voltage-compensated reference value $V_{ref}$. When the fan motor 6 takes the connection position shown by dashed lines, the electronic control device 14 can also monitor the motor current passing through the fan motor 6.

The electronic switch 25 is driven by means of this control signal S such that the power P(t) drawn from the power supply system 13 by the illumination 2 of the ceiling fan 1 is automatically regulated down to the maximum power value $P_{max}=190$ W if the presently measured current I(t) exceeds a value which is above the computationally permissible power $P_{max}=U*I_{max}$. If an electromagnetic switch in the form of a relay is provided as a controllable switch 25, the power will be limited through a switch-off of the illumination 2, if the electrical power P(t) drawn by the illumination 2 exceeds the predetermined maximum power value $P_{max}$.

This application is based, in part, on our copending application Ser. No. 11/280,628, filed Nov. 16, 2005; the earlier application is herewith incorporated by reference in its entirety.

We claim:

1. A ceiling fan with electrical illumination, comprising:

a fan casing and a connection casing for connecting a fan motor and one or more light sources to a power supply system;

an electronic control device configured to automatically limit an electrical power drawn by the one or more light sources from the power supply system to a predetermined power value; and said electronic control device being configured to regulate the electrical power down to a maximum power value of less than, or equal to, 190 W.

2. The ceiling fan according to claim 1, wherein said electronic control device comprises first means for detecting an actual current and second means configured to compare a power value derived from the actual current and from an actual voltage with a reference value and to limit the actual current based on the comparison such that the electrical power drawn by the luminous means is less than, or equal to, a maximum power value.

3. The ceiling fan according to claim 1, wherein said electronic control device comprises:

a sensor for measuring a power parameter;

a comparator with a first comparator input connected to said sensor, a second comparator input for supplying a reference parameter, and a comparator output; and a controllable switch connected to said comparator output.

4. The ceiling fan according to claim 3, wherein said sensor is a current sensor for measuring actual currents supplied to said one or more light sources.

5. The ceiling fan according to claim 3, wherein said electronic control device has an electronic amplifier with an amplifier input connected to said sensor and an amplifier output connected to said first comparator input.

6. The ceiling fan according to claim 3, wherein said controllable switch is a relay.

7. The ceiling fan according to claim 3, wherein said controllable switch is a power semiconductor.

8. The ceiling fan according to claim 3, wherein said controllable switch is a thyristor or a triac.

9. The ceiling fan according to claim 1, wherein said electronic control device is disposed in said connection casing.

10. The ceiling fan according to claim 1, wherein said electronic control device is configured for monitoring a motor current drawn by the fan motor from the power supply system.

11. An electronic control device for a ceiling fan with electrical illumination, the control device comprising:

a senor measuring a power parameter;

a controllable switch connected to said sensor for automatically limiting an electrical power drawn from a power supply system by the electrical illumination to a predetermined power value; and said controllable switch being configured to regulate the electrical power down to a maximum power value of less than, or equal to, 190 W.

12. The electronic control device according to claim 11, wherein said sensor is configured to measure an actual current as the power parameter.

* * * * *